United States Patent [19]

Ivashin

[11] 3,826,909

[45] July 30, 1974

[54] DYNAMIC COMPARISON TESTER FOR GO-NO-GO TESTING OF DIGITAL CIRCUIT PACKAGES IN NORMAL ENVIRONMENT

[75] Inventor: Victor S. Ivashin, Reno, Nev.

[73] Assignee: The National Cash Register Company, Dayton, Ohio

[22] Filed: Mar. 29, 1973

[21] Appl. No.: 346,174

[52] U.S. Cl............................ 235/153 AC, 324/73 R
[51] Int. Cl............................................. G06f 11/00
[58] Field of Search.............. 235/153 AC, 153 AE; 324/73 R; 340/172.5

[56] References Cited
UNITED STATES PATENTS

| | | | |
|---|---|---|---|
| 3,082,374 | 3/1963 | Buuck.......................... | 235/153 AC |
| 3,541,441 | 11/1970 | Hrustich....................... | 235/153 AC |
| 3,636,443 | 1/1972 | Singh et al. .................. | 235/153 AC |
| 3,740,645 | 6/1973 | Cook............................. | 324/73 R |
| 3,740,646 | 6/1973 | McMahon...................... | 324/73 R |
| 3,764,995 | 10/1973 | Helf et al. .................... | 324/73 R |

*Primary Examiner*—Charles E. Atkinson
*Attorney, Agent, or Firm*—J. T. Cavender; Albert L. Sessler, Jr.; Edward Dugas

[57] ABSTRACT

A testing apparatus employing a binary counter to supply identical signals to a tested and a standard reference circuit is disclosed. The tested includes a program controller, a self-contained power supply, analog and digital comparison circuits, along with output indicators for displaying the difference, if any, between the tested and standard reference circuit.

10 Claims, 4 Drawing Figures

3,826,909

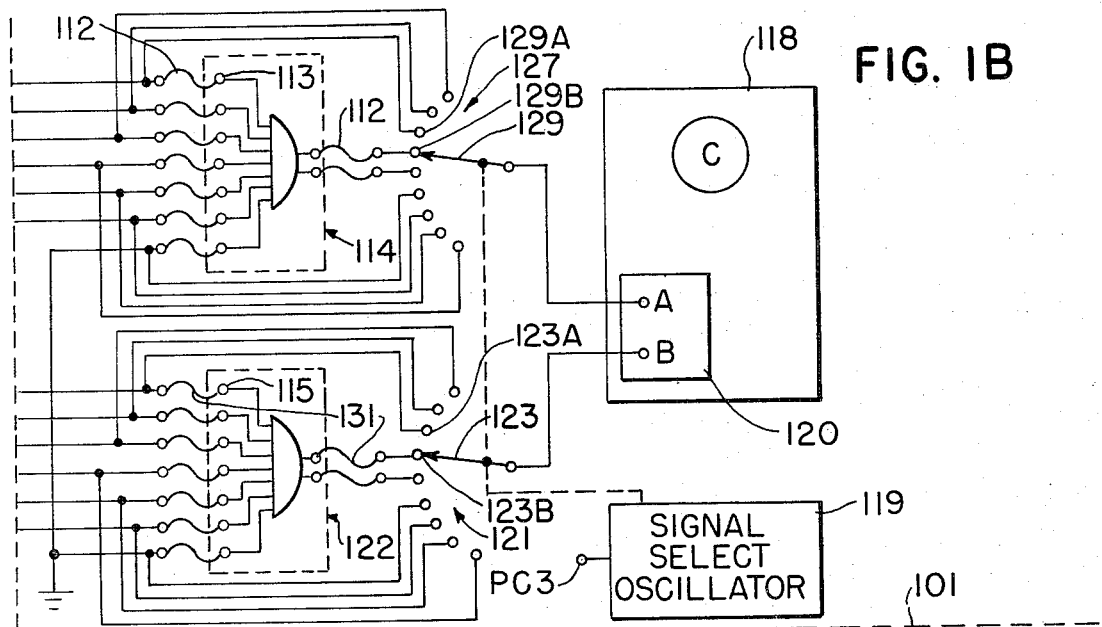
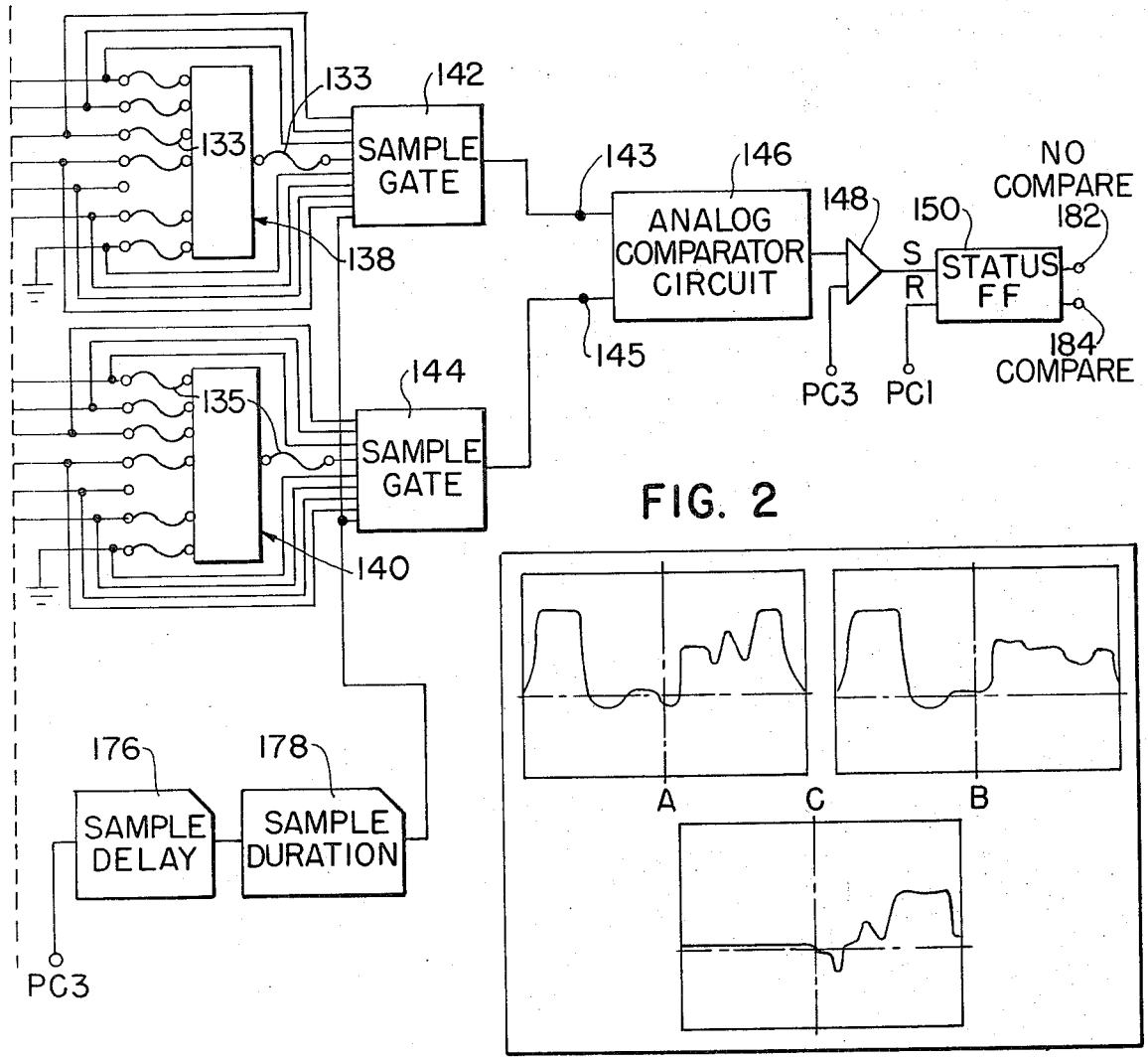
FIG. 1B
FIG. 2

DYNAMIC COMPARISON TESTER FOR GO-NO-GO TESTING OF DIGITAL CIRCUIT PACKAGES IN NORMAL ENVIRONMENT

BACKGROUND OF THE INVENTION

This invention relates to automatic testing of digital electronic circuits on a comparison basis using a large variety of digital input signals.

DESCRIPTION OF THE PRIOR ART

Comparison testing of electronic circuitry is known in the testing art. For instance, U.S. Pat. No. 3,522,532, issued Aug. 4, 1970, on the application of H.L. McCoy, shows comparison testing apparatus wherein the response of a standard and a reference circuit to a recorded test signal are compared. The invention of the McCoy patent employs a tape recording and playback device to store signals corresponding to the test signals applied to a standard test circuit along with the response signals present in the test circuit. A circuit under test is stimulated with the recorded test signal while its response signals are compared against the recorded response signals of the test circuit.

U.S. Pat. No. 3,271,674, issued Sept. 6, 1966, on the application of K.R. Horning et al., also shows the use of comparison testing wherein the same signal is applied to both a standard and an unknown circuit. In the Horning patent, a binary counter is used to control the application of different signals to the standard circuit and the circuit under test. A differential amplifier means compares the response signals from the standard circuit against the response signals from the circuit under test and provides an output indicative of any difference.

In the present invention a binary counter is used as a signal source for exercising both the standard and the tested circuit.

In the December, 1971 issue of the *Hewlett Packard Journal*, a publication by the Hewlett Packard Company, Palo Alto, Calif. there is described a Clip and Read Comparator for comparing the output signals of two similar integrated electronic circuits, one a standard and one an unknown. The tester of the present invention is distinguished from that of the Hewlett Packard publication by: the type of test signal employed, the self-contained power supply; and the processing techniques for the standard circuit and reference circuit output signals.

BRIEF SUMMARY OF THE INVENTION

The present invention provides improved automatic testing for digital logic circuitry by supplying variable frequency digital counter signals to the inputs of a reference standard circuit and a similar circuit under test. The invention also provides a signal indicator and comparison means for processing signals obtained from both the input and output terminals of the standard and test circuits for presenting an indication of the degree of signal comparison to an operator.

BRIEF DESCRIPTION OF THE DRAWINGS

FIGS. 1A and 1B combine to show a block diagram of an electrical testing apparatus made according to the present invention;

FIG. 2 shows a set of three waveforms which are typical of the signals encountered with the apparatus of FIGS. 1A and 1B.

DETAILED DESCRIPTION OF THE INVENTION

Figure 1A:
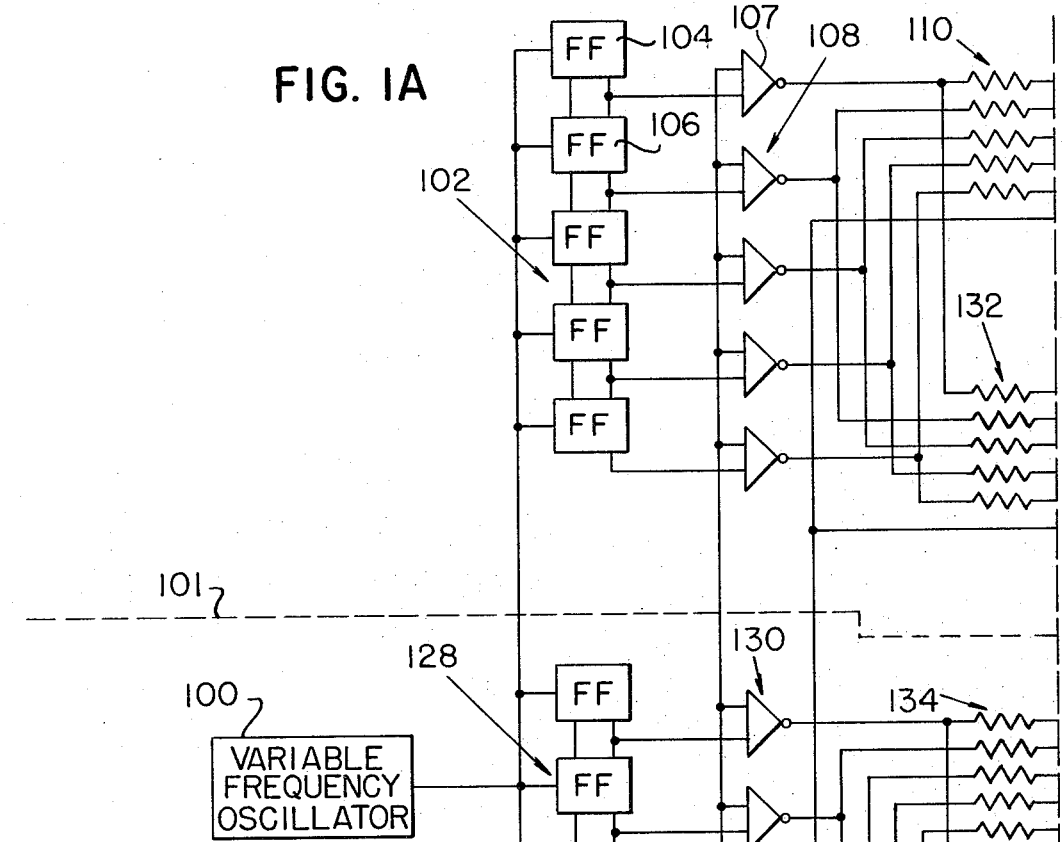
Figure 3:
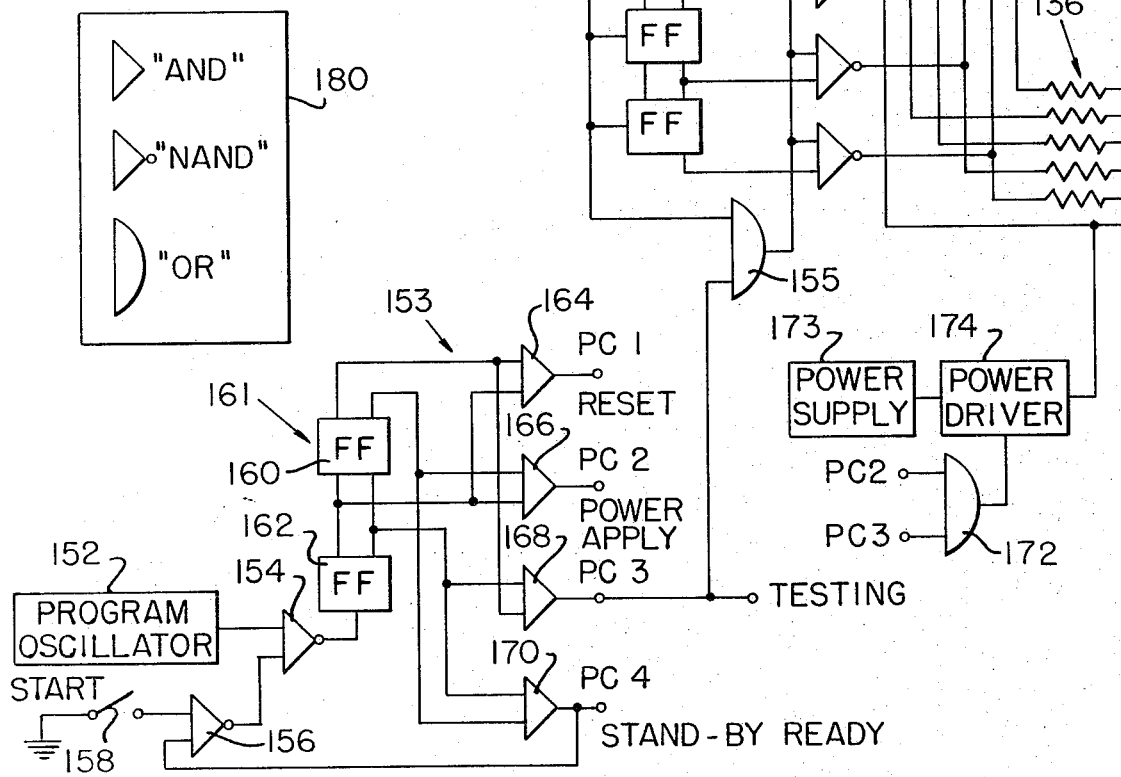
FIG. 3 shows a glossary of symbols which are used in the block diagrams of FIGS. 1A and 1B.

In FIGS. 1A and 1B the preferred embodiment of an electrical testing apparatus made according to the present invention is shown. The testing apparatus of FIG. 1A and 1B consists of a source of signals which includes a variable frequency oscillator 100 in FIG. 1A, and a pair of binary counter circuits 102 and 128 which include a plurality of flip flops of the type identified with the numbers 104 and 106. The output of each flip flop is connected to one input of an associated NAND driving gate 107. The NAND driving gates are divided into two separate arrays 108 and 130. The symbols used for NAND gates and the other logic gates in FIGS. 1A and 1B are identified in FIG. 3.

The first binary counter circuit 102 is connected by the array of NAND driving gates 108 to a first circuit under test 122, and a first reference circuit 114 via isolating resistance elements 132 and 110, and flexible leads 131 and 112. The first circuit under test 122 and the first reference circuit 114 are connected to a first comparison and indicating device, an oscilloscope 118, through the switches 121 and 127 respectively. The switches 121 and 127 are also connected to a signal select oscillator 119 which in turn is connected to a program oscillator decoding gate 168 through the terminal labeled PC3. The second binary counter 128 is connected to a second circuit under test 140 and a second reference circuit 138 by way of the array of NAND driving gates 130, isolating resistors 134 and 136, and flexible leads 133 and 135. The second circuit under test 140 and the second reference circuit 138 are connected to an analog comparator circuit 146 by way of sample gates 144 and 142, respectively. The analog comparator circuit 146 is connected to the "compare" and "no compare" output terminals 184 and 182, respectively, by an AND gate 148 and status flip flop 150.

Also shown in FIG. 1A is a program control circuit 153 which consists of a counter circuit 161 containing flip flop memory elements 160 and 162. The program oscillator 152 and a manually operable test start switch 158 are connected to the program counter 161 by way of NAND gates 154 and 156. The output of counter 161 is connected to the inputs of counter decoding gates 164, 166, 168, 170. The outputs of the counter decoding gates are connected to several designated points in the testing apparatus for the control of events in the testing sequence as is explained subsequently.

By way of describing two alternate embodiments of the testing invention, the testing apparatus is capable of simultaneously testing two unknown circuits. The portion of FIGS. 1A and 1B below the dotted line 101 is one complete testing apparatus and provides for evaluation of the circuit 140 under test, while the portion of the apparatus above the dotted line 101 is a second complete testing apparatus which may be used with a program control circuit independently of the lower portion testing apparatus if desired. If continuation of the alternate embodiment description of the invention, a different form of comparison and indication circuitry is shown for each portion of the testing apparatus, and also the comparison signal selection switches 121 and 127 are shown embodied only into the apparatus of the upper portion of FIGS. 1A and 1B. The comparison and indication function in the upper half of the FIG. 1 apparatus is performed by the oscilloscope 118 while the comparison and indication function for the apparatus of the lower half of FIG. 1 is performed by the analog comparator 146 and associated circuit components.

During operation of the testing apparatus, timed clock signals are generated by the variable frequency oscillator 100, (FIG. 1A) and are applied to the binary counter circuits 102 and 128. The binary counter circuits 102 and 128 may include wiring which interconnects the individual flip flops as a conventional ripple-down counter or as a Gray code counter. The outputs of the successive flip flops such as 104 and 106, in counters 102 and 128, are gated and amplified by the NAND driver circuits 108 and 130 and then employed as input signals for the circuit under test and the reference circuit.

Since the input terminals of the circuit under test 122 and the reference circuit 114 receive identical signals from the NAND drivers 108, these input terminals as well as the output terminals of these two circuits should always be in electrical coincidence if the circuit under test is in fact identical with the reference circuit. The identity of output signals is especially significant when the two circuits are compared, since it is well-known in the art that the output signals of a binary counter of the type employed as a signal source in this tester will pass through all possible logical states while counting from a reset condition to a maximum count condition. The present invention also compares all inputs to determine if there are deviations at these points. Because of this "counting through all possible logical states," each input and output terminal of both the circuit under test and the reference circuit will be placed in every possible binary condition in combination with each other input and output terminal of these circuits.

As an example of the utility of a tester employing counters, such as the counters 102 and 128 as signal sources, consider the situation wherein the circuit under test 122 is known to have a defective condition causing the input terminal 115 to be wrongfully held at the "true" logic state. Because of the every possible binary combination test signal previously described, it is predictable that in some state of counting, the counter 102 will require that the defective input terminal 115 be alone the only "false" logical input to the circuit under test 122 and that the defective condition at terminal 115 will prevent terminal 115 from reaching this "false" state; coincidentally, the corresponding input terminal 113 on the reference circuit 114 will be able to reach the required false state because it is not defective. Since the input terminals 113 and 115 of the reference circuit and the circuit under test will be in different logical states during the time the counter 102 attempts to make the terminal 115 logically false, a difference in the output waveforms of the circuits 122 and 114 will be observed on the comparison oscilloscope 118. The defective status of the terminal 115 on the circuit under test 122 can be detected by either one of two comparisons made with the comparison oscilloscope 118. The first of these comparisons examines the input waveforms at the two terminals 113 and 115 when the wipers 129 and 123 of the switches 127 and 121 are positioned to input positions 129A and 123A, while the second comparison examines the output waveforms at one or more of the output terminals when the wipers 129 and 123 of the switches 127 and 121 are positioned to output positions 129B and 123B.

The switches 121 and 127 allow the comparison oscilloscope 118 to have convenient access to the input and output terminals of both the circuit under test 122 and the reference circuit 114. These switches can be embodied in the form of mechanical positioning devices as shown or can alternatively be embodied using solid state electronic elements to perform the signal commutation function.

In FIG. 1B, signals from the reference circuit 114 and the circuit under test 122 are connected to oscilloscope inputs which are algebraically subtracted, that is, the preamplifier 120 of the oscilloscope 118 provides, to the oscilloscope deflection circuitry, a signal which represents the difference between the selected reference circuit signal and the selected circuit under test signal. The use of an algebraically subtractive preamplifier 120 in the tester provides waveforms, such as shown in FIG. 2, on the oscilloscope. The waveforms of FIG. 2A represent the output signal of the reference circuit 114 while the waveform of FIG. 2B represents the output signal of a defective circuit under test 122 when both of these circuits are receiving input signals from a binary counter such as the counter 102. As shown by the resultant of the FIGS. 2A and 2B waveforms, in FIG. 2C, the lefthand portion of the FIGS. 2A and 2B waveforms are in fact substantially identical and provide a zero resultant waveform when subtracted while the righthand portions of the FIG. 2A and 2B waveforms are substantially different and provide the non-zero resultant waveform shown in the righthand portion of FIG. 2C. The waveform differences shown in FIGS. 2A and 2B are typical of the test condition wherein the circuit under test 122 has at least one defective input signal path and the reference circuit 114 is normal.

In the testing apparatus of FIGS. 1A and 1B, during the time the signal at a defective input terminal happens to coincide with the signal supplied by the counter 102, it is clear that no difference will exist between the output of the circuit under test 122 and the reference circuit 114, this, for example, being part of the conditions illustrated in the lefthand portion of FIGS. 2A and 2B. Only when the counter 102 requires that the defective input terminal transfer to a state other than that of the defect will the faulty condition be exposed as is illustrated in the righthand portion of FIGS. 2A and 2B.

The algebraically subtractive preamplifier 120 is well adapted for use in the present testing apparatus since it provides an easily recognizable straight line oscilloscope trail when the circuit under test and the reference circuit generate the desired identical waveforms. The algebraically subtractive preamplifier does however inherently provide the same straight line oscilloscope trace even though no signal is received from the circuit under test and the reference circuit.

The switches 121 and 127 allow the oscilloscope to connect with each of the input terminals and each of the output terminals of the circuit under test 122 and the reference circuit 114. Comparison between all input and output terminals of the two circuits 114 and 122 increases the probability of the tester locating each defect present in the circuit under test even without the loading and operating environment of the tester duplicating exactly the environment of the circuits normal usage. It is found that only the most unusual circuit defect does not influence either the input or the output terminals of a circuit under test.

The testing of all terminals of the circuit under test also insures that the tester will examine all of the output terminals of a flip-flop or latch or other multiple output terminal circuit.

The switches 121 and 127 are shown embodied in the form of a double gang stepping switch. It is of course possible for these switches to be embodied using a tree of solid state electronic devices such as field effect transistors or bipolar transistors while yet preserving the desired short time delay and analog conduction of signals between the compared circuits 114 and 122 and the indicator (oscilloscope).

The movable arms 123 and 129 of the switches 121 and 127 move between the various input and output pins of the circuits 114 and 122 in response to commands from the signal select oscillator 119. The signal select oscillator 119 is in turn driven by the PC3 signal from the program control circuit 153 (FIG. 1A). It is possible for the signal select oscillator 119 to be combined with the program control circuit 153 in other embodiments of the invention, since the function of the signal select oscillator is simply to maintain the switch arms 123 and 129 in each of the possible switch positions for a time which will allow the variable frequency oscillator 100 to place the counters 102 and 128 in each possible state of counting.

The circuitry below the dotted line 101 in FIGS. 1A and 1B functions in a manner identical to that above the dotted line up to the point of processing signals from the circuit under test and the reference circuit. In the lower portion of FIG. 1B, switches corresponding with the switches 121 and 127 are not shown and the oscilloscope 118 is replaced by an electronic circuit which includes an analog comparator circuit 146. The analog comparator circuit 146 provides an output signal at one binary state so long as the two input terminals 143 and 145 are held at a common voltage level and provides another binary output signal when these two terminals are at different voltage levels.

Since the analog comparator circuit 146 cannot alone distinguish the desired duration of testing time from the remaining operating time, it is necessary to provide gating circuitry such as the sample gates 142 and 144 and the AND gate 148 which will limit the analog comparator circuit to an examination of the output signals during a desired interval of testing. If the analog comparator circuit 146 finds a brief period of disagreement between the output of the reference circuit 138 and the output of the circuit under test 140, during this examination period, the flip-flop 150 is placed in the set condition and the "no compare" output terminal 182 is activated. The flip flop 150 serves as a memory element which allows an operator to be alerted to a signal difference condition which actually lasts only a few microseconds of time. As an alternate embodiment of the apparatus, a plurality of flip flop circuits can be used to replace the single flip flop circuit 150 in the situation where it is desired to identify to the operator the particular terminal numbers or the particular counting states of the counter 128 which caused the signal from the circuit under test and the reference circuit to be different. With such a plurality of memory flip flops employed, the tester will provide a plurality of error indication signals or error lamps, one for each state of the switches 121 and 127, so that the precise location of the defective condition can be isolated. A tester, which includes this plurality of indication signals or error lamps, will for example indicate the existence of an error condition at both the output terminal and at least one input terminal when a defective input condition exists in the circuit under test.

The portions of the output signals from the reference circuit 138 (FIG. 1B) and the circuit under test 140 which are examined by the analog comparator circuit 146 are selected by the sample gates 142 and 144. The sample gates 142 and 144 are activated by a signal received from the sample duration circuit 178 during a brief sample interval. This sample interval may be located at any desired point along the complete output waveform of the circuits 138 and 140, after the transients resulting from changes in the switches corresponding to switches 121 and 127 in the upper half of FIG. 1 have terminated. The sample delay circuit 176 which is illustrated in FIG. 1B is a one-shot multivibrator which provides the time delay between commencing the test of circuits 138 and 140 and the time of initiating the sample to be examined by the analog comparator circuit 146. The sample duration circuit 178 selects the length of time during which signals from the two circuits 138 and 140 are to be compared.

The overall sequence of testing operations is controlled by the program control circuit 153, which circuit provides a cycle of four test intervals. During the first of the four test intervals, which is initiated by a signal from gate 164 and is identified as PC1 "RESET," the tester is returned to a home state and the flip flop 150 is reset. During the second of the four test intervals a signal labeled PC2 "POWER APPLY" appears at the output of gate 166 causing power to be applied to the test and reference circuits. During the third of the testing intervals, the signal PC3 "TESTING" appears at the output of gate 168, initiating the actual comparison of signals at the reference test circuit. In the fourth of the test intervals, the signal PC4 "STAND BY READY" appears at the output of gate 170, so as to maintain the testing apparatus in a standby or ready condition awaiting the initiation of a new test cycle.

The times designated as "RESET," "POWER APPLY," "TESTING," and "STANDBY READY" are identified by the four states of the counter 161 which includes flip flops 160 and 162. The combination of these flip flops is placed sequentially in four states by clock pulses provided by the program oscillator 152 when the operator closes the start switch 158. The program oscillator 152 is adjusted to operate at some low frequency, as compared with the time duration of the variable frequency oscillator 100, in order that the circuits under test be exposed to at least one complete cycle of counting of the counters 102 and 128 during the PC3 "TESTING" state.

Power for the electronic circuitry of the testing apparatus, for the circuit under test and for the reference circuit is supplied by the power supply 173. This power is gated during the PC2 "POWER apply" and PC3 "TESTING" intervals of the tester by the power driver circuit 174 which is responsive to the output from the OR gate 172. The power driver circuit 174 applies power to the circuit under test and the reference circuit only during the PC2 "POWER APPLY" interval and the PC3 "TESTING" interval; longer application of power to the tested circuits can be accomplished by altering the signals fed into the OR gate 172.

In addition to the testing of circuits for grossly defective or castastrophic failure conditions, the testing apparatus is also capable of testing for the non-catastrophic failure or marginal performance of a digital circuit. In this mode of testing the apparatus can locate such failure conditions as a decrease in transistor operating speed or a change of transistor gain. Testing for these non-catastrophic failures is accomplished in the apparatus by changing the frequency spectrum of the test signals applied to the test and reference circuit through a change in the operating frequency of the variable frequency oscillator 100. The variable frequency oscillator 100 is adjustable by an operator to allow for this change. By increasing the frequency of the variable frequency oscillator 100, the time duration between pulses in the signal applied to the test and reference circuits may be decreased until the point of failure of a slow circuit or a circuit with low transistor gain is reached. This point of failure is recognized by the comparison and indication circuitry as a failure of the compared output to coincide for at least a part of the testing interval.

In many currently used digital circuit packages, the only external terminals available on the circuit to be tested are terminals connected both with the circuit to be tested and with one or more additional circuits which are internally connected to the circuit to be tested. In many instances these addition internally connected circuits provide a path by which the output signal of the circuit to be tested can reach the input terminal of the circuit to be tested in a feedback loop configuration. Since the feedback inputs to the circuit under test are internally wired and are not susceptible to being driven by any form of testing apparatus it is clear that some technique is desirable for eliminating the effects of signals traveling around the feedback circuit on both the output of the circuit under test and the output of the reference circuit. The signal sampling circuitry provides one method by which the effect of a feedback loop on these circuits may be removed. If the sample selected for testing from both the circuit under test and the reference circuit is taken as a very short duration sample, that is, located very soon after the application of signal to these circuits, it is possible to evaluate circuit performance without interference by signals traveling around the feedback loop; that is, the sample to be tested is taken over such a short period and so quickly after the signal is applied to the circuit under test, that signals have not had sufficient time to propagate around the feedback loop surrounding the circuit to be tested, and the feedback loop terminals to the circuit under test can be neglected in evaluating the circuit output signal.

The testing apparatus with either the oscilloscope comparator 118 or the analog comparator 146 provides an analog test of a digital circuit since both the oscilloscope 118 and the analog comparator 146 provide a point-for-point comparison between a known good and potentially defective circuit, rather than quantizing the outputs of these circuits and making digital comparisons of the quantized signals, as would be done in a digital testing apparatus. Analog comparison testing of digital circuits has been found to be more sensitive to circuit defects which leave the circuit partially operative than is the prior art digital testing. Sensitivity to partially operative circuit defects together with the ability to toggle all possible combinations of input signals into the tested and the reference circuits at any selected toggle frequency has been found to constitute a test that is sufficiently rigorous to identify almost all defective and marginal digital circuits tested.

The present apparatus incorporates two forms of signal gating which are considered to be timed electrical samplings of circuit performance. One electrical sampling means involves the gates 142 and 144, which perform the short period sampling of circuit performance described above, while the other sampling means includes the decoding gates 164 to 170, which select a part of the circuit operating time to be regarded as a period of testing; that is, sample of the total operating time is selected for test consideration by the decoding gate 168. By way of describing the present invention, the short period sampling using the gates 142 and 144 is employed only with the analog comparator circuit 146. It is also possible to employ the short period sampling technique when other forms of comparison such as that provided by the oscilloscope 118 are employed.

The counters 102 and 128 as mentioned above may be embodied as either conventional ripple down counters or as one of the Gray code counters which are well known in the art. A Gray code counter offers some advantages in the testing apparatus since only the input of the circuit under test and the reference circuit will change state at any particular time with a Gray code counter and since the output signals from the tested circuits are thereby made simpler and easier to interpret by either the oscilloscope 118 or the analog comparator 146.

It has been found convenient to arrange all of the signal and power supply conductors for one circuit into a flexible lead cable and to terminate this cable at the circuit end with a spring loaded clip device (not shown) which can be easily attached and removed from the circuit under test while this circuit is mounted in its normal printed circuit board environment.

While the system and apparatus hereof accomplishes the objects and advantages mentioned, certain variations may occur to those skilled in the art and it is contemplated that all such variations not departing from the spirit and scope of the invention hereof are to be construed in accordance with the following claims.

What is claimed is:

1. Electrical testing apparatus for classifying the electrical performance of a first electrical circuit package with respect to the electrical performance of a second standard circuit package, said apparatus comprising in combination:

a plurality of gating means corresponding in number to the number of inputs on one of said circuit packages;

binary counter means having at least one binary stage for each input of one of said circuit packages, with the output of each binary stage connected simultaneously to a corresponding input of said first and said second electrical circuit packages by one of said gating means;

pulse means for supplying pulses simultaneously to binary counter means and to said plurality of gate means so as to gate the counter present at the output of each binary stage through said gating means to the inputs of said first and said second electrical circuit packages;

sampling means connectible to corresponding input and output terminals of said first and said second electrical circuit packages in a selectable order;

cycle counter means connected to said sampling means for selecting the order of sampling; and analog comparing means for comparing the sample from said sampling means corresponding to said first electrical circuit package against the sample from said second electrical circuit package to provide an indication of any difference between the two samples which difference tends to indicate a defect in one of the electrical circuit packages.

2. The electrical testing apparatus according to claim 1 wherein said pulse means is a variable frequency oscillator providing an output of harmonically related frequencies and wherein said cycle counter means causes said sampling means to sample each of the corresponding inputs and outputs for each harmonically related frequency of said pulse means.

3. Electrical testing apparatus for classifying the electrical performance of a first electrical circuit package with respect to the electrical performance of a second standard electrical circuit package, said apparatus comprising in combination;

binary counter means having at least one binary stage connected at the output thereof with both said first and said second electrical circuit packages for simultaneously supplying to said circuit packages test signals having a plurality of different frequency components;

pulse means for supplying pulses to said binary counter means;

sampling means connected to said first and said second electrical circuit packages for sampling the pulses applied to and emanating from said first and said second electrical circuit packages, said means including a program control circuit for selectively controlling the application of power and signals to said first and said second circuit packages in accordance with a preselected testing sequence; and analog comparison means connected to receive the sampled signals from said first and said second electrical circuit packages and for generating an error signal indicative of the difference between the received signals.

4. Electrical testing apparatus for classifying the electrical performance of a first electrical circuit package with respect to the electrical performance of a second standard electrical circuit package, wherein said first and said second electrical circuit packages comprise multiple input logic gates, said apparatus comprising in combination:

binary counter means having a plurality of binary stages each of said multiple inputs of said gates being connectable to the output of a different binary stage of said binary counter means for simultaneously supplying to said circuit packages test signals having a plurality of different frequency components;

pulse means for supplying pulses to said binary counter means;

sampling means connected to said first and said second electrical circuit packages for sampling the pulses applied to and emanating from said first and said second electrical circuit packages; and analog comparison means connected to receive the sampled signals from said first and said second electrical circuit packages and for generating an error signal indicative of the difference between the received signals.

5. Electrical testing apparatus for classifying the electrical performance of a first electrical circuit package with respect to the electrical performance of a second standard electrical circuit package, said apparatus comprising in combination:

binary counter means having at least one binary stage connected at the output thereof with both said first and said second electrical circuit packages for simultaneously supplying to said circuit packages test signals having a plurality of different frequency components;

pulse means for supplying pulses to said binary counter means;

sampling means connected to said first and said second electrical circuit packages for sampling the pulses applied to and emanating from said first and said second electrical circuit packages; and analog comparison and indicator means comprised of an oscilloscope having algebraically subtractive signal input paths and connected to receive sampled signals from said first and said second electrical circuit packages and for generating an indicated error signal indicative of the difference between the received signals.

6. Electrical testing apparatus for classifying the electrical performance of a first electrical circuit package with respect to the electrical performance of a second standard electrical circuit package, said apparatus comprising in combination:

binary counter means having at least one binary stage connected at the output thereof with both said first and said second electrical circuit packages for simultaneously supplying to said circuit packages test signals having a plurality of different frequency components;

pulse means for supplying pulses to said binary counter means;

sampling means connected to said first and said second electrical circuit packages for sampling the pulses applied to and emanating from said first and said second electrical circuit packages;

analog comparison means connected to receive the sampled signals from said first and said second electrical circuit packages and for generating an error signal indicative of the difference between the received signals;

electrical contact means for connecting to said first and said second electrical circuit packages; and flexible electrical conductors for connecting said apparatus to said electrical contact means so as to maintain a flexible connection between said apparatus and said circuit packages.

7. Electrical testing apparatus for classifying the electrical performance of a first electrical circuit package with respect to the electrical performance of a second standard electrical circuit package, said apparatus comprising in combination:

binary counter means having at least one binary stage connected at the output thereof with both said first and said second electrical circuit packages for simultaneously supplying to said circuit packages test signals havig a plurality of different frequency components;

pulse means for supplying pulses to said binary counter means;

sampling means connected to said first and said second electrical circuit packages for sampling the pulses applied to and emanating from said first and said second electrical circuit packages;

analog comparison means connected to receive the sampled signals from said first and said second electrical circuit packages and for generating an error signal indicative of the difference between the received signals; and means for selectively connecting said analog comparison means with each corresponding input terminal and each corresponding output terminal of said first and said second electrical circuit packages such that said electrical testing apparatus is capable of identifying an electrical circuit having defective input components without dependence upon the output signals from said circuit.

8. A method for testing multiple input binary electronic logic gate circuits comprising the steps of:

a. energizing two of said logic gate circuits, the first one of said energized circuits being the circuit under test and the second being a substantially similar standard circuit;

b. applying simultaneously to each of said multiple inputs of said first and said second logic gate circuits first pulse signals of different, harmonically related synchronized frequencies, such that said multiple inputs of each of said logic gate circuits are simultaneously toggled through all possible logical combinations by said pulse signals;

c. comparing point for point the signal output of said first and second logic gate circuits, generating during said comparing, an error signal representative of the difference between said outputs; and d. changing the pulse repetition frequency of said pulse signals of different harmonically related synchronized frequencies and repeating step c for each such change.

9. A method for testing multiple input binary electronic logic gate circuits comprising the steps of:

a. energizing two of said logic gate circuits, the first one of said energized circuits being the circuit under test and the second being a substantially similar standard circuit;

b. simultaneously connecting each input of said first and said second logic gate circuits to a different binary output of an electronic counter circuit to apply first pulse signals of different harmonically related synchronized frequencies to each said input, such that said inputs of each of said logic gate circuits are simultaneously toggled through all possible logical combinations by said electronic counter circuit; and c. comparing point for point the signal output of said first and second logic gate circuits, generating during said comparing, an error signal representative of the difference between said outputs.

10. A method for testing multiple input binary electronic logic gate circuits comprising the steps of:

a. energizing two of said logic gate circuits, the first one of said energized circuits being the circuit under test and the second being a substantially similar standard circuit;

b. applying simultaneously to each of said multiple inputs of said first and said second logic gate circuits first pulse signals of different, harmonically related synchronized frequencies, such that said multiple inputs of each of said logic gate circuits are simultaneously toggled through all possible logical combinations by said pulse signals;

c. comparing point for point the signal output of said first and second logic gate circuits, generating during said comparing, an error signal representative of the difference between said outputs; and d. sampling the output signal from said gate circuits for a brief time interval commencing after the applied signals have propagated through said gate circuits and terminating the sampling before the applied signals have propagated through any circuit feedback paths.

* * * * *

UNITED STATES PATENT OFFICE
CERTIFICATE OF CORRECTION

Patent No. 3,826,909                    Dated July 30, 1974

Inventor(s) Victor S. Ivashin

It is certified that error appears in the above-identified patent and that said Letters Patent are hereby corrected as shown below:

Column 8, line 67, delete "counter" and substitute --count--.

Signed and sealed this 29th day of April 1975.

(SEAL)
Attest:

RUTH C. MASON
Attesting Officer

C. MARSHALL DANN
Commissioner of Patents
and Trademarks